United States Patent [19]

Mallikarjun

[11] Patent Number: 4,968,747
[45] Date of Patent: Nov. 6, 1990

[54] COMPATIBILIZED BLENDS OF CRYSTALLINE PROPYLENE POLYMERS AND STYRENIC COPOLYMERS

[75] Inventor: Ramesh Mallikarjun, West Chester, Pa.

[73] Assignee: Arco Chemical Technology, Inc., Wilmington, Del.

[21] Appl. No.: 501,589

[22] Filed: Mar. 30, 1990

[51] Int. Cl.$^5$ .................. C08L 23/10; C08L 35/06; C08L 37/00; C08L 51/04
[52] U.S. Cl. ........................... 525/74; 525/71; 525/93; 525/207; 525/208
[58] Field of Search ............. 525/74, 71, 93, 207

[56] References Cited

U.S. PATENT DOCUMENTS

| | | | |
|---|---|---|---|
| 4,386,187 | 5/1983 | Grancio et al. | 525/96 |
| 4,386,188 | 5/1983 | Grancio et al. | 525/96 |
| 4,582,871 | 4/1986 | Noro et al. | 524/413 |
| 4,657,975 | 4/1987 | Kodama et al. | 525/74 |
| 4,705,827 | 11/1987 | Kodama et al. | 525/67 |

FOREIGN PATENT DOCUMENTS

| | | |
|---|---|---|
| 59-66444 | 4/1984 | Japan. |
| 60-188443 | 9/1985 | Japan. |
| 61-34037 | 2/1986 | Japan. |
| 63-205341 | 8/1988 | Japan. |
| 1-009254 | 1/1989 | Japan. |
| WO88/07564 | 10/1988 | World Int. Prop. O. |

OTHER PUBLICATIONS

Bartlett et al, Modern Plastics, Dec. 1981, p. 60.

*Primary Examiner*—Carman J. Seccuro
*Attorney, Agent, or Firm*—Stephen D. Harper

[57] ABSTRACT

Thermoplastic resin compositions having good toughness and resistance to heat deformation are obtained by blending crystalline propylene polymers, elastomeric olefin polymers, random styrenic copolymers, and epoxy group-containing copolymers. For example, the composition may be a blend of polypropylene, ethylene-propylene or ethylene-propylene-diene monomer rubber, styrene/maleic anhydride copolymer, and ethylene/glycidyl methacrylate or ethylene/glycidol methacrylate/vinyl acetate copolymer. Physical properties are enhanced by the use of a two step blending procedure.

20 Claims, No Drawings

COMPATIBILIZED BLENDS OF CRYSTALLINE PROPYLENE POLYMERS AND STYRENIC COPOLYMERS

FIELD OF THE INVENTION

This invention is directed to compatibilized polyblends of crystalline propylene polymers, random styrenic copolymers, elastomeric olefin polymers and epoxy group-containing olefinic copolymers. The invention also relates to methods for the preparation of such thermoplastic resin compositions whereby the impact and heat distortion properties of the polyblends are improved.

BACKGROUND OF THE INVENTION

Crystalline propylene polymers have been widely used for a number of years as low cost thermoplastic resins in the production of fibers, coatings, containers, pipes, and the like. Propylene homopolymer is typically about 60 to 70 percent crystalline and consequently has good chemical resistance to hydrocarbons, alcohols, acids, and alkalies. To improve the toughness, however, propylene is commonly copolymerized with minor amounts of ethylene. The resulting decrease in crystallinity significantly lowers the melting point and heat resistance of the polymer. Fillers and reinforcements are often added to increase the stiffness and heat resistance and to reduce part shrinkage or warpage. The presence of such additives adversely affects the impact properties of the polymer. Thus, it is apparent there is a need for polypropylene-based resins having physical properties which are sufficiently improved such that they are suitable for use as engineering resins.

Propylene polymers have been blended with a variety of other polymers for the purpose of obtaining blends having properties superior to those of polypropylene. Since polypropylene is immiscible with most other polymers, however, it has typically been necessary to use a third polymer as a compatibilizer.

For example, U.S. Pat. Nos. 4,386,187 and 4,386,188 teach thermoformable polymer blend compositions comprising an olefin polymer (e.g., polypropylene), a styrene polymer, and a styrenic block copolymer rubber compatibilizer.

Bartlett et al (*Mod. Plastics* December 1981, p. 60) teach the use of hydrogenated styrene/butadiene block copolymers as compatibilizers for blends of general purpose polystyrene and polypropylene.

U.S. Pat. No. 4,582,871 discloses thermoplastic resin compositions comprising a propylene polymer, a styrene polymer, a styrenic block copolymer rubber compatibilizer, and an inorganic filler.

Jpn. Pat. No. 63-205341 teaches resin blends comprised of low molecular weight polypropylene, a styrene/maleic anhydride copolymer, and a styrenic block copolymer rubber compatibilizer.

Jpn. Pat. No. 59-66,444 discloses blends of polypropylene, an ethylene/glycidyl methacrylate/vinyl acetate terpolymer, and a graft polymer of ethylene-propylene-diene monomer rubber graft-polymerized with a mixture of styrene and acrylonitrile.

Jpn. Pat. No. 86-34037 teaches the modification of polypropylene with an epoxy group-containing olefinic copolymer such as an ethylene/glycidyl methacrylate copolymer.

SUMMARY OF THE INVENTION

This invention provides a thermoplastic resin composition comprising from about 25 to 75 weight percent of a crystalline propylene polymer, from about 5 to 40 weight percent of a random styrenic copolymer of from about 50 to 99 weight percent of a vinyl aromatic monomer, from about 1 to 30 weight percent of an unsaturated dicarboxylic acid derivative, and optionally, up to about 40 weight percent of a copolymerizable ethylenically unsaturated monomer selected from the group consisting of unsaturated nitriles, unsaturated carboxylic acids, unsaturated carboxylic acid esters and mixtures thereof, from about 2 to 40 weight percent of an elastomeric olefin polymer selected from the group consisting of ethylene-propylene copolymers, ethylene-propylene-diene terpolymers, blends of ethylene-propylene copolymers with ethylene homopolymers, blends of ethylene-propylene-diene terpolymers with ethylene homopolymers, monovinyl aromatic monomer/conjugated diene block copolymers, and hydrogenated mono-vinyl aromatic monomer/conjugated diene block copolymers, and from about 0.05 to 15 weight percent of an epoxy group-containing olefinic copolymer of from about 0.1 to 25 weight percent of an unsaturated epoxy monomer, from about 50 to 99 weight percent of an α-olefin, and optionally, up to about 50 weight percent of an ethylenically unsaturated ester.

Also provided by this invention is a process for the preparation of such thermoplastic resin compositions comprising the steps of melt-blending the random styrenic copolymer, the epoxy group-containing olefinic copolymer, and a first portion of the elastomeric olefin polymer to obtain a first polyblend and then melt-blending the first polyblend with the crystalline propylene polymer and a second portion of the elastomeric olefin polymer to form the compatibilized thermoplastic resin composition.

DETAILED DESCRIPTION OF THE INVENTION

A. Crystalline Propylene Polymer

The thermoplastic resin compositions of this invention contain from about 25 to 75 weight percent, preferably from about 40 to 60 weight percent, of a crystalline propylene polymer. The crystalline propylene polymer may be either a homopolymer of propylene or a copolymer of a propylene with a minor amount (preferably, from about 1 to 20 weight percent) of another olefin such as ethylene, 1-butene, 4-methyl-1-pentene, 1-hexene, 1-octene, and the like. Block, random, or mixed block/random copolymers may be employed. The apparent crystalline melting point of the crystalline propylene polymer is preferably from about 140° to 180° C.; it is not necessary for this component to be completely crystalline (i.e., 100% isotactic). The number average molecular weight of the crystalline propylene polymer is preferably above about 10,000 and more preferably is greater than about 50,000. Preferably, the crystalline propylene polymer is a crystalline propylene homopolymer, a crystalline propylene-ethylene copolymer, or a mixture of these resins. The ethylene content of the copolymer is preferably from about 1 to 20 weight percent.

Methods of preparing the crystalline propylene polymers described above are well-known in the art. General descriptions of such methods may be found, for example, in "Propylene Polymers" *Encyclopedia of Polymer Science and Engineering* 2nd Ed., Wiley-Interscience, Vol. 13, pp. 464–530(1988) and "Olefin Polymers" *Kirk-Othmer Encyclopedia of Chemical Technology* 3rd Ed., Wiley-Interscience, Vol. 16, pp. 385–479(1981). The teachings of these reviews are incorporated herein by reference.

Illustrative examples of suitable commercially available crystalline propylene polymers include "Norchem NPP8006-GF" (a general purpose propylene homopolymer sold by Quantum Chemical Corp.), "Escorene 1052" (a general purpose propylene homopolymer sold by Exxon Chemical Co.), "Pro-Fax 6323" (a general purpose propylene homopolymer sold by Himont U.S.A., Inc.) and "Tenite P64MZ-007" (a propylene copolymer sold by Eastman).

B. Random Styrenic Copolymer

The thermoplastic resin compositions of this invention additionally are comprised of from about 5 to 40 (more preferably, from about 15 to 30) weight percent of a random styrenic copolymer. The random styrenic copolymer is a copolymer of from about 50 to 99 weight percent of a vinyl aromatic monomer, from about 1 to 30 weight percent of an unsaturated dicarboxylic acid derivative, and, optionally, up to about 40 weight percent of a copolymerizable ethylenically unsaturated monomer. It is preferred that the random styrenic copolymer be comprised of from about 70 to 95 weight percent vinyl aromatic monomer and from about 5 to 30 weight percent unsaturated dicarboxylic acid anhydride.

Although any suitable vinyl aromatic monomer may be employed in the random styrenic copolymer, styrene is the preferred monomer because of its low cost and availability. Examples of other vinyl aromatic monomers which can be used include, but are not limited to, ar-methyl styrene, ar-ethyl styrene, ar-tert-butyl styrene, ar-chloro styrene, alpha-methyl styrene, divinyl benzene, vinyl benzyl chloride, and vinyl naphthalene, as well as other alkyl- or halo-substituted styrenes. Mixtures of vinyl aromatic monomers can be used.

The preferred unsaturated dicarboxylic acid derivative is an unsaturated dicarboxylic acid anhydride. Exemplary unsaturated dicarboxylic acid anhydrides include itaconic anhydride, citraconic anhydride, ethyl maleic anhydride, methyl itaconic anhydride, chloromaleic anhydride, bromomaleic anhydride, tetrahydrophthalic anhydride, and, most preferably, maleic anhydride. However, other $\alpha,\beta$-unsaturated dicarboxylic acid derivatives may also be employed including $\alpha,\beta$-unsaturated dicarboxylic acids such as maleic or fumaric acid and maleimides such as N-methyl maleimide, N-phenyl maleimide, N-tribromophenyl maleimide, and the like. If desired, mixtures of $\alpha,\beta$-unsaturated dicarboxylic acid derivatives can be used.

The optional copolymerizable ethylenically unsaturated monomer may be selected from the group consisting of unsaturated nitriles (e.g., acrylonitrile and methacrylonitrile), unsaturated carboxylic acids (e.g., acrylic acid and methacrylic acid), unsaturated carboxylic acid ester (especially $C_1$–$C_4$ alkyl esters such as methyl methacrylate and ethyl acrylate), and mixtures thereof. Terpolymers of styrene, maleic anhydride, and acrylonitrile or styrene, maleic anhydride, and methyl methacrylate are particularly preferred.

In the most preferred embodiment of this invention, the random styrenic copolymer is a copolymer of styrene and maleic anhydride. The random styrenic copolymer preferably has a number average molecular weight of from about 30,000 to 500,000 and a melt flow rate (Condition L) of from about 0.1 to 10 g/10 min.

Rubber-modified random styrenic copolymers may also be employed. Such copolymers preferably contain from about 1 to 35 (more preferably, from about 5 to 25) weight percent of a grafted elastomer. The grafted elastomer is preferably selected from the group consisting of conjugated diene elastomers and ethylene-propylene-diene monomer elastomers.

Conjugated diene elastomers suitable for use as the grafted elastomer preferably contain at least about 50 weight percent of a conjugated diene and have glass transition temperatures less than about 0° C. (more preferably, less than about −20° C.). Such rubbers include homopolymers, random copolymers, and block copolymers of conjugated 1,3-dienes such as 1,3-butadiene (a preferred diene), isoprene, chloroprene, 1,3-pentadiene, 2,3-dimethyl-1,3-butadiene, and the like. The conjugated diene elastomer is preferably selected from the group consisting of mono-vinyl aromatic monomer/conjugated diene block copolymers, mono-vinyl aromatic monomer/conjugated diene random copolymers, conjugated diene homopolymers, and mixtures thereof.

The conjugated diene elastomer may contain one or more copolymerizable ethylenically unsaturated comonomers. Most preferably, the comonomer is a mono-vinyl aromatic monomer such as styrene, ar-methyl styrene, ar-ethyl styrene, ar-tert-butyl styrene, ar-chlorostyrene, alpha-methyl styrene, vinyl benzyl chloride, vinyl naphthalene, and the like and mixtures thereof. Other copolymerizable ethylenically unsaturated monomers may be employed, however, including unsaturated nitrile monomers such as acrylonitrile and methacrylonitrile, alkyl acrylates such as methyl methacrylate, methyl acrylate, butyl acrylate, or 2-ethylhexyl methacrylate, acrylamides such as acrylamide, methacrylamide, or butylacrylamide, unsaturated ketones such as vinyl methyl ketone or methyl isopropenyl ketone, $\alpha$-olefins such as ethylene or propylene, vinyl esters such as vinyl acetate or vinyl stearate, vinyl heterocyclic monomers such as vinyl pyridine, vinyl and vinylidene halides such as vinyl chloride or vinylidene chloride, and the like and mixtures thereof. In a preferred embodiment of this invention, the comonomer used in combination with the 1,3-conjugated diene is the same as the vinyl aromatic monomer component of the random styrenic copolymer.

Exemplary conjugated diene elastomers suitable for grafting onto the random thermoplastic copolymer include styrene/butadiene and styrene/isoprene block copolymers. Such block copolymers may be linear, radial, or branched in structure. Linear block copolymers may have an ABA, AB(AB)$_n$A, (AB)$_n$, or similar structure wherein A represents a block of the mono-vinyl aromatic monomer, B represents a block of the conjugated diene and n is an integer of 1 to 10. Radial block copolymers may have an (AB)$_n$ X structure, wherein X is a multi-valent linking agent. Block copolymers of these types are well-known. Details concerning their preparation, structure, and properties may be found, for example, in the following references: "Styrene-Diene Block Copolymers" *Encyclopedia of Polymer Science and Technology* 1st Ed., Suppl., Wiley, pp 508–530(1971), K. E. Snavely et al, *Rubber World* 169, 45(1973), and "Thermoplastic Elastomers" *Kirk-*

*Othmer Encyclopedia of Chemical Technology* 3rd., Vol. 8, Wiley-Interscience, pp 627–632(1981).

The following U.S. patents, incorporated herein by reference, further describe such block copolymer conjugated diene elastomers: U.S. Pat. Nos. 3,937,760, 3,231,635, 3,265,765, 3,198,774, 3,078,254, 3,244,644, 3,280,084, 3,954,452, 3,766,301, 3,281,383, 4,640,968, 4,503,188, 4,485,210, 4,390,663, 4,271,661, and 4,346,193. Suitable block copolymers are also presently available from commercial sources. Examples of commercially available block copolymer elastomers include "Stereon 840A" (a linear graded styrene/butadiene multi-block copolymer containing about 43% styrene and having a number average molecular weight of about 60,000, sold by Firestone Synthetic Rubber and Latex Co.), "Stereon 730A" (a stereospecific tapered styrene/butadiene block copolymer containing a total of 30% styrene with 21% styrene in block form and having a number average molecular weight of 140,000, sold by Firestone Synthetic Rubber and Latex Company), "Kraton D-1101" (a linear styrene/butadiene/styrene triblock copolymer containing 31% styrene, sold by Shell Chemical), "Kraton D-1107" (a linear styrene/isoprene/styrene triblock copolymer containing 14% styrene, sold by Shell Chemical), and "Kraton D-1184" (a branched styrene/butadiene multiblock copolymer containing 30% styrene, sold by Shell Chemical).

Also suitable for use as conjugated diene elastomers in the rubber-modified styrenic resin component of this invention are random copolymers of mono-vinyl aromatic monomers and conjugated dienes. A particularly preferred conjugated diene elastomer of this type is styrene/butadiene rubber (SBR). Homopolymers of conjugated dienes such as polybutadiene and polyisoprene may also be employed as the grafted rubber. All such rubbers are well-known in the art and are described, for example, in "Butadiene Polymers" *Encyclopedia of Polymer Science and Engineering* 2nd Ed., Wiley-Interscience, Vol. 2, pp. 537–590(1988), the teachings of which are incorporated by reference herein in their entirety.

The grafted elastomer may alternatively be an ethylene propylene diene monomer (EPDM) rubber. Such materials are well-known in the art and are random copolymers of ethylene, at least one $C_3$–$C_6$ $\alpha$-olefin (preferably propylene), and at least one nonconjugated diene. The nonconjugated diene may be a linear aliphatic diene of at least six carbon atoms which has either two terminal double bonds or one terminal double bond and one internal double bond. Alternatively, the nonconjugated diene may be a cyclic diene where one or both of the double bonds are part of a carboxcyclic ring. The structure of the EPDM rubber may be altered as desired, particularly with respect to branching, by the selection of particular nonconjugated dienes as is well known in the art. Particularly preferred nonconjugated dienes include 1,4-hexadiene, dicyclopentadiene, vinyl norbornene, norbornadiene, and 5-ethylidene-2-norbornene. Preferably, the EPDM elastomer contains from about 40 to 90 mole percent ethylene and 0.1 to 7.5 mole percent nonconjugated diene, with the remainder being propylene. Additional information regarding EPDM elastomers may be found in "Ethylene-Propylene Elastomers" *Encyclopedia of Polymer Science and Engineering* 2nd Ed., Wiley-Interscience, Vol. 6, p. 522–564(1986), the teachings of which are incorporated herein by reference.

The random styrenic copolymers useful in the compositions of this invention may be prepared by any of the several methods available for their synthesis. For example, the copolymers may be obtained by solution copolymerization directly from the respective monomers by the incremental addition of the more reactive monomer as taught by U.S. Pat. No. 2,971,939 or by a continuous recycle polymerization process described in U.S. Pat. Nos. 2,769,804 and 2,989,517. Alternatively, a suspension polymerization process as taught in U.S. Pat. No. 3,509,110 may be employed. Rubber-modified random styrenic copolymers may be prepared by incorporation of the elastomer to be grafted into the monomer mixture prior to polymerization using, for example, the methods of U.S. Pat. Nos. 4,097,551 and 3,919,354. The teachings of all these patents are incorporated herein by reference. Suitable commercially available random styrenic copolymers include the "Dylark" styrene/maleic anhydride resins produced by ARCO Chemical Company.

C. Elastomeric Olefin Polymer

The thermoplastic resin compositions of this invention also include from about 2 to 40 (more preferably, from about 15 to 35) weight percent of an elastomeric olefin polymer. The elastomeric olefin polymer should have a glass transition temperature less then about $-20°$ C. (more preferably, less than about $-50°$ C.) and may be selected from the group consisting of ethylene-propylene copolymers, ethylene-propylene-diene terpolymers, blends of ethylene-propylene copolymers with ethylene homopolymers, blends of ethylene-propylene-diene terpolymers with ethylene homopolymers, mono-vinyl aromatic monomer/conjugated diene block copolymers, and hydrogenated mono-vinyl aromatic monomer/conjugated diene block copolymers.

Suitable elastomeric ethylene-propylene copolymers will advantageously contain from about 10 to 80 mole percent propylene, although it is preferred that the propylene content be from about 25 to 75 mole percent. Examples of commercially available ethylene-propylene copolymers which can be used as the elastomeric olefin polymer component of this invention include "Vistalon 719" (a high ethylene EPR available from Exxon Chemical Company) and "Epcar 306" (an EPR available from B. F. Goodrich).

The types of elastomeric ethylene-propylene-diene terpolymers suitable for use in this invention are the types generally referred to in the art as "EPDM" rubbers. The nonconjugated diene usable in the preparation of such terpolymers may be a linear aliphatic diene of at least six carbon atoms which has either two terminal double bonds or one terminal double bond and one internal double bond. Alternatively, the nonconjugated diene may be a cyclic diene wherein one or both of the double bonds are part of a carboxylic ring. The structure of the terpolymer may be altered as desired, particularly with respect to branching, by the selection of particular nonconjugated dienes as is well known to those skilled in the art. Particularly preferred nonconjugated dienes include 1,4-hexadiene, dicyclopentadiene, and 5-ethylidene-2-norbornene.

In this embodiment, it is preferred that the random terpolymer contain from about 40 to 90 mole percent ethylene and 0.1 to 7.5 mole percent nonconjugated diene, with the remainder being propylene.

Suitable commercially available ethylene-propylene-diene terpolymers include, for example, "EPsyn 70-A"

(available from Copolymer Rubber Co.), "Buna AP 251" (an ethylidenenorbornene EPDM available from Bunawerke Huls), and "Esprene EPDM 301" (a dichloropentadiene EPDM having an ethylene/propylene ratio of from 40/60 to 70/30 available from Sumitomo Chemical Co.).

Methods of obtaining ethylene-propylene copolymers and ethylene-propylene-diene terpolymers are well known in the art and are described, for example, in ver Strate, "Ethylene-Propylene Elastomers", *Encyclopedia of Polymer Science and Engineering*, Vol. 6, Wiley-Interscience (1988), p. 522–564 (the teachings of which are incorporated herein by reference). The weight average molecular weight of suitable ethylene-propylene copolymers and ethylene-propylene-diene terpolymers is preferably from about 1,000 to 1,000,000. The ethylene-propylene copolymers and ethylene-propylene-diene terpolymers may be blended with polyethylene (preferably, high density polyethylene); polyethylene:elastomer ratios of from about 0.05:1 to 1:1 generally are preferred. Blends of this type are available commercially, including "IM-7565" (a 0.5:1 blend of high density polyethylene and ethylene-propylene-diene terpolymer available from Uniroyal Chemical Company).

The elastomeric olefin polymer may also be either a monovinyl aromatic monomer/conjugated diene block copolymer or a hydrogenated mono-vinyl aromatic monomer/conjugated diene block copolymer.

The mono-vinyl aromatic monomer may be one or more compounds containing a vinyl functional group attached directly to an aromatic ring. Exemplary monovinyl aromatic monomers are styrene (the preferred such monomer), ar-alkyl styrenes such as p-methyl styrene, p-tert-butyl styrene, and o,p-diemethyl styrene, ar-halo styrenes such as o-chloro styrene and o,p-dichloro styrene, vinyl benzyl chloride, vinyl naphthalene, and alpha-methyl styrene and the like and mixtures thereof. Although the preferred conjugated diene is 1,3-butadiene, other such compounds as chloroprene, isoprene, 2,3-dimethyl butadiene, 1,3-pentadiene, and the like and their mixtures may also be employed.

Elastomeric olefin polymers of this type suitable for use in this invention will contain at least one "soft" rubbery B block comprised predominantly of repeating units of one or more conjugated dienes (or their hydrogenated derivatives) and at least one "hard" thermoplastic A block comprised predominantly of repeating units of one or more mono-vinyl aromatic monomers. The "soft" block has a glass transition temperature below about 0° C.; more preferably, the Tg is less than about −20° C. The compatibilizer may have a linear, branched, or radial structure. Linear compatibilizers can have an ABA, AB(AB)$_n$A, (AB)$_n$, or similar structure where n is an integer from 1 to 10. Radial compatibilizers may have an (AB)$_n$X structure, wherein X is a multi-valent linking agent. In a preferred embodiment, the elastomeric olefin polymer has a linear triblock structure and is a styrene/butadiene or hydrogenated styrene/butadiene block copolymer. The amount of styrene in such elastomeric olefin polymers preferably varies from about 10 to 60 weight percent and the overall molecular weight is preferably in the range of from about 35,000 to 300,000.

Block copolymers suitable for use as elastomeric olefin polymers in the polyblends of this invention are well-known. Such materials are described, for example, in "Styrene-Diene Block Copolymers" *Encyclopedia of Polymer Science and Technology* 1st Ed., Suppl., Wiley, pp. 508–570(1971), K. E. Snavely *Rubber World* 169, 45(1973), and "Thermoplastic Elastomers" *Kirk-Othmer Encyclopedia of Chemical Technology* 3rd Ed., Vol. 8, Wiley-Interscience, pp. 627–632(1981).

The following exemplary U.S. patents, incorporated herein by reference, describe the preparation and properties of suitable mono-vinyl aromatic monomer/conjugated diene block copolymers useful as elastomeric olefin polymers: U.S. Pat. Nos. 3,265,765, 3,937,760, 3,251,905, 3,287,333, 3,281,383, 3,692,874, 4,346,193, 4,371,661, 4,390,663, 4,485,210, 4,503,188, 4,640,968, 3,078,254, 3,778,490, 3,639,521, 3,903,201, 3,149,182, 3,231,635, 3,390,207, 3,567,798, 3,594,452, 3,639,523, and 3,890,408.

Elastomeric olefin polymers which are hydrogenated mono-vinyl aromatic monomer/conjugated diene block copolymers may be obtained by the methods given in the following U.S. patents, incorporated herein by reference: U.S. Pat. Nos. 3,595,942, 3,700,633, 3,333,024, 3,706,817, 3,415,759, 3,507,934, 3,644,588, 3,670,054, 3,700,748, 3,792,005, 3,792,127, and U.S. Pat. No. Re. 27,145.

Commercially available block copolymers may also be used as the elastomeric olefin polymer component of the thermoplastic resin compositions of this invention, including, for example, "Kraton G-1652" (a linear hydrogenated styrene/butadiene triblock copolymer containing 29% styrene, sold by Shell Chemical), "Kraton G-1657X" (a linear hydrogenated styrene/butadiene triblock copolymer containing 13% styrene and 35% diblock copolymer, sold by Shell Chemical), "SOL T-168" (a radial styrene/butadiene block copolymer containing 43% styrene, sold by Enichem), and "SOL T-192" (a styrene/isoprene block copolymer containing 25% styrene, sold by Enichem).

D. Epoxy Group-Containing Olefinic Copolymer

An epoxy group-containing olefinic copolymer is employed in the thermoplastic resin compositions of this invention at a concentration of from about 0.05 to 15 weight percent. More preferably, however, the epoxy group-containing olefinic copolymer represents from about 0.25 to 5 weight percent of the total resin composition. An optimum balance of high DTUL and high impact strength is generally achieved using from about 0.5 to 3 weight percent epoxy-group containing olefinic copolymer. At higher levels, the heat resistance of the blend tends to be adversely affected.

Without wishing to be bound by theory, it is believed that the epoxy group-containing olefinic copolymer functions as a compatibilizer for the other components of the resin compositions of this invention by reducing the interfacial tension between the random styrenic copolymer phase and the crystalline propylene polymer phase and by improving adhesion between the phases. In a compatibilized blend, the minor component is dispersed uniformly and finely (ave. domain size<1-2 microns) in the matrix resin.

It is thought that compatibilization in the blends of this invention results from the reaction of the epoxy groups of the epoxy group-containing olefinic copolymer and the anhydride groups of the random styrenic copolymer since polymers which do not contain epoxy groups but which are otherwise similar in composition to the epoxy group-containing copolymers do not generally work well as compatibilizers in these types of polyblends. For example, attempts to use ethylene-vinyl acetate copolymer containing 30–40 weight percent vinyl acetate in place of the epoxy group-containing copolymer yielded polymer blends having unsatisfactory impact properties.

The epoxy group-containing olefinic copolymer is comprised of recurring units of an unsaturated epoxy monomer, an α-olefin, and, optionally, an ethylenically unsaturated ester. The unsaturated epoxy monomer, which preferably is from about 0.1 to 25 weight percent (more preferably, from about 1 to 15 weight percent) of the epoxy group-containing olefinic copolymer, is advantageously selected from the group consisting of unsaturated glycidyl esters, unsaturated glycidyl ethers, glycidyl vinyl aromatic monomers, and epoxy alkenes. Suitable unsaturated glycidyl esters include compounds having the general formula

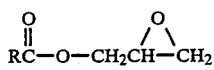

wherein R is a $C_2$–$C_{18}$ hydrocarbon group having an ethylenically unsaturated bond. Examples of unsaturated glycidyl esters include, but are not limited to, glycidyl acrylate, glycidyl methacrylate, glycidyl crotonate, and the like. Unsaturated glycidyl ethers having the general formula

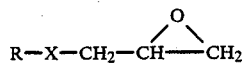

are also suitable for use, wherein R is a $C_2$–$C_{18}$ hydrocarbon group having an ethylenically unsaturated bond and X is

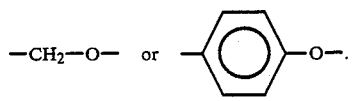

Representative unsaturated glycidyl ethers are allyl glycidyl ether and 2-methyl allyl glycidyl ether. Glycidyl vinyl aromatic monomers such as p-glycidyl styrene are also useful. Such compounds will have the general formula

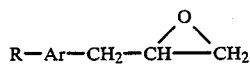

wherein R is a $C_2$–$C_{18}$ hydrocarbon group having an ethylenically unsaturated bond and Ar is an aromatic radical (phenyl, naphthyl, or the like). The epoxy alkenes which may be utilized preferably have the structure

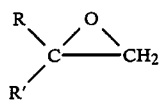

wherein R is a $C_2$–$C_{18}$ hydrocarbon group having an ethylenically unsaturated bond and R, is methyl or hydrogen. Illustrative epoxy alkenes include, but are not limited to, 3,4-epoxy butene, 3,4-epoxy-3-methyl-1-butene, 3,4-epoxy-1-pentane, 3,4-epoxy-3-methyl pentene, 5,6-epoxy-1-hexene, and vinyl cyclohexene monoepoxide.

The α-olefin component of the epoxy group-containing olefinic copolymer is most preferably ethylene, but may be any other copolymerizable α-olefin such as propylene or 1-butene. Mixtures of α-olefins, such as a mixture of ethylene and propylene, may also be employed. The amount of α-olefin is preferably from about 50 to 99 weight percent.

Optionally, up to about 50 weight percent of an ethylenically unsaturated ester copolymerizable with the other components of the epoxy group-containing olefinic copolymer may also be present. Suitable ethylenically unsaturated esters include vinyl esters of $C_2$–$C_6$ saturated carboxylic acids such as vinyl acetate and vinyl butyrate and $C_1$–$C_8$ alkyl esters of unsaturated carboxylic acids such as methyl methacrylate, methyl acrylate, n-butyl acrylate, ethyl methacrylate, and the like.

In preferred embodiments of this invention, the epoxy group-containing olefinic copolymer is either a copolymer of from about 80 to 99.9 weight percent ethylene and from about 0.1 to 20 weight percent glycidyl methacrylate or a terpolymer of from about 60 to 99 weight percent ethylene, from about 0.1 to 20 weight percent glycidyl methacrylate, and from about 1 to 20 weight percent vinyl acetate. The number average molecular weight is preferably from about 1,000 to 1,000,000, but most preferably is from about 3,000 to 50,000. Suitable epoxy group-containing olefinic copolymers of this type are available from Sumitomo Chemical Co., including, for example, "Bondfast 2B". The epoxy group-containing olefinic copolymers may be prepared using any suitable method known in the art such as free-radical polymerization in a high pressure autoclave at a temperature of from about 100° to 300° C. using a peroxy initiator such as di-t-butyl peroxide. It is preferred that the epoxy-group olefinic copolymer has a random structure wherein the unsaturated epoxy monomer is interpolymerized with the other monomer(s), rather than grafted onto a polymer of the other monomer(s).

E. Method of Preparing Thermoplastic Resin Composition

The blending of the crystalline propylene polymer, random styrenic copolymer, elastomeric olefin polymer, and epoxy group-containing olefinic copolymer may be performed in any manner that produces a compatibilized polyblend. "Compatibilized" in this context means that the thermoplastic resin composition produced is dimensionally stable and does not exhibit delamination upon molding and in subsequent use. One suitable method is to dissolve the components in a common solvent and then precipitate the composition by combining the solution with a non-solvent in which none of the components are soluble.

However, the preferred procedure is to intimately mix the components in the form of granules and/or powder in a high shear mixer at an elevated temperature. Intimate mixing may be accomplished by the use of extrusion compounding machines such as single or twin screw compounding extruders or thermoplastic extruders having preferably at least a 20:1 L/D ratio and a compression ratio of about 3 or 4:1. The polyblend may be either supplied directly to a molding machine or converted into pellet form for further processing.

The mixing temperature is selected in accordance with the particular components to be blended. For example, generally it will be desirable to select a melt blending temperature above the melting or softening point of the component having the highest melting or softening point, but below the temperature at which thermal degradation of any component becomes significant. Blending temperatures between about 190° C. and 330° C. are generally suitable.

A catalyst may advantageously be incorporated into the components of the thermoplastic resin composition prior to blending to catalyze the apparent reaction between the anhydride and epoxy groups and to promote good compatibilization. The use of a catalyst during melt-blending permits the use of lower processing temperatures (i.e., <220° C.). Tertiary amines such as trialkylamines, 1,4-diazobicyclo [2.2.2] octane, N-alkyl morpholines, N,N-dimethyl cyclohexyl amine, 1,5-diazabicyclo[5.4.0] undec-5-ene, N,N-dimethylpiperazine, alkoxy and amino substituted pyridines bis-(z-dimethyl amino ethyl) ether, tetrazoles, triphenylamine, and the like and mixtures thereof are preferred for use. Catalyst concentrations of from about 0.01 to 1 part by weight per 100 parts by weight resin composition are generally suitable.

In a preferred embodiment of this invention, the thermoplastic resin composition is produced in a two step process. In the first step, a first polyblend is formed by melt-blending the random styrenic copolymer, the epoxy group-containing olefinic copolymer, and a first portion of the elastomeric olefin polymer. The melt-blending is preferably accomplished at a temperature of from about 190° C. to 330° C. The first polyblend is then melt-blended with the crystalline propylene polymer and a second portion of the elastomeric olefin polymer, which may have a composition the same as or different from the composition of the first portion of elastomeric olefin polymer. The first portion of the elastomeric olefin polymer is at least about 1 percent (more preferably, at least about 5 percent) of the total amount of the elastomeric olefin polymer. For reasons which are not well understood, this two step procedure yields compatibilized resin compositions of high impact strength and good heat resistance using very low levels (i.e., from about 0.25 to 3 weight percent) of the epoxy group-containing olefinic copolymer. This is an important practical advantage since the epoxy group-containing olefinic copolymer will typically be the most expensive component of the composition. To obtain a comparable degree of impact strength using a single step blending procedure generally requires the use of significantly higher concentrations of the epoxy group-containing olefin copolymer. The higher amounts of this component tend to increase the overall cost of the composition and to adversely affect the heat resistance of the blend.

The thermoplastic resin composition of this invention may be combined with any of the standard thermoplastic additives such as fillers, reinforcing agents, colorants, lubricants, anti-static agents, stabilizers, fire retardants, anti-oxidants, anti-blocking agents, and/or other compounding ingredients. Such additives may be added to the final resin composition or introduced during melt-blending of the individual components, for example.

Examples of fillers which may be blended with the resin compositions of this invention include, but are not limited to, mineral fillers such as calcium carbonate, dolomite, silicates, silicas, talc, koalin, mica, magnesium phosphate, barium sulfate, titanium oxide, and the like, organic fillers such as carbon black, and fibrous fillers such as glass fiber (including strands and chopped fiber), carbon fiber, graphite fiber, synthetic thermoplastic fiber (e.g., aliphatic polyamide, aromatic polyamide, polyethylene, polypropylene), ceramic fiber, and boron fiber. The weight ratio of resin to filler is preferably from about 0.5:1 to 20:1.

Any of the known thermoplastic forming techniques may be used to shape the thermoplastic resin compositions of this invention into final products. These techniques include, but are not limited to, injection molding, extrusion, thermoforming, stamping, structural foam molding, extrusion blow molding, injecting blow molding, rotational molding, and the like. The compositions of this invention are particularly useful for the production of shaped parts by thermoforming, wherein a flat sheet of the resin is softened by heating and then shaped through the use of a mold and some combination of heat, pressure, vacuum, or mechanical assists. After cooling, the part retains the shape of the mold. A number of variations on this general technique are possible, including, for example, straight vacuum forming, drape forming, matched mold forming, pressure bubble plug assist vacuum forming, air slip forming, free forming, plug assist vacuum forming or trapped sheet contact heat pressure forming. Thermoforming can operate as part of an integrated system wherein an extruder produces a resin sheet which is immediately formed and trimmed while still warm. Crystalline olefin polymers such as polypropylene or ethylene-propylene copolymers have relatively sharp melting points and consequently have relatively narrow processing windows. That is, once the sheet of olefin polymer is heated to a thermoformable temperature, the sheet will not support its own weight and will readily sag. This tendency to sag results in difficulties in handling the softened sheet during the molding step. In contrast, the thermoplastic resin compositions of this invention have much wider processing windows and thus are better suited to thermoforming applications.

From the foregoing description, one skilled in the art can readily ascertain the essential characteristics of this invention, and, without departing from the spirit and scope thereof, can make various changes and modifications of the invention to adapt it to various usages, conditions, and embodiments.

The following examples further illustrate the moldable polyblends of this invention, but are not limitative of the invention in any manner whatsoever.

EXAMPLES 1–5

These examples demonstrate the preparation of the thermoplastic resin compositions of this invention by a two step compounding procedure. In the first step, 80 parts by weight of a styrene/maleic anhydride copolymer containing about 14 weight percent maleic anhydride and having a melt flow rate (Condition L) of 1.6 g/10 min. was melt-blended with 20 parts by weight of "IM-7565" elastomeric olefin polymer (a 2:1 blend of EPDM rubber and high density polyethylene, available from Uniroyal Chemical Company). In Examples 2–5, sufficient "Bondfast 2B" (an ethylene/glycidyl methacrylate/vinyl acetate terpolymer available commercially from Sumitomo Naugatuck Co. Ltd.) was also added to bring the amount of epoxy group-containing olefinic copolymer in the final thermoplastic resin composition to the level shown in Table I. For comparative purposes, no epoxy group-containing olefinic copolymer was added to Example 1.

The components were blended using an Egan 1.5' single screw/single vent extruder (L/D=24:1) and the following conditions:

```
RPM: 165
Vacuum: 50 torr
Screw Type: Stratablend screw
Hopper Throat: Water-cooled
Zone Temp. (°F.):
1                470
2                470
3                470
4                470
Die              470
```

The intermediate compositions thus obtained (25 parts by weight) were then melt-blended with 50 parts by weight polypropylene and 25 parts by weight "IM-7565" using the blending conditions described above to obtain the final thermoplastic resin compositions. Each compositions thus contained approximately 50 parts by weight polypropylene, 30 parts by weight elastomeric olefin polymer, 20 parts by weight styrene/maleic anhydride copolymer, and the amount of epoxy group-containing olefin copolymer shown in Table I.

Molded samples for testing of physical properties were obtained by injection molding using a Reed 5 oz. 100 ton injection molding machine and the following conditions:

```
Zone 1                470     F
Zone 2                470     F
Zone 3                470     F
Nozzle                465     F
Inj. Pressure         650     psi
Hold Pressure         450     psi
Back Pressure         100     psi
Mold Close Time       45      sec
Mold Temp.            120     F
Screw Speed           60      rpm
Inj. Forward Setting  8       sec
Mold Open             .8      sec
Mold Close            45      sec
Cushion               ⅛       inches
Shot Size             4⅛      inches
Melt Temp.            475     F
```

Standard ASTM methods were used to measure the physical properties of the thermoplastic resin compositions; the test results are given in Table I. As the amount of epoxy group-containing olefin copolymer was increased, significant improvements in penetration impact and notched Izod impact strength were achieved. At the same time, no appreciable deterioration in tensile strength, stiffness, or heat resistance was observed. The addition of just 2.5 parts epoxy group-containing olefin copolymer led to a greater than 50% improvement in penetration impact while the notched Izod value was nearly doubled. At the same time, a 15° F increase in DTUL (264 psi) was observed. The results were surprising since typically improvement in the impact properties of a polyblend is accompanied by a pronounced loss in resistance to heat deformation.

EXAMPLES 6-7

The advantages of the thermoplastic resin compositions of the present invention over propylene homopolymer or impact-modified polypropylene are illustrated by these comparative examples. Propylene homopolymer (Example 6) has acceptable heat resistance but is fairly brittle. When the polypropylene (75 parts by weight) is blended with 25 parts "IM-7565" elastomeric olefin polymer to rubber modify the resin (Example 7), the impact properties are improved but the DTUL value drops to an unsatisfactory level. In contrast, the thermoplastic resin compositions of Examples 2-5 simultaneously have both high impact strength and good heat resistance.

EXAMPLES 8-12

These examples illustrate the preparation of the thermoplastic resin compositions of this invention by a single step blending process. Polypropylene (50 parts by weight), styrene/maleic anhydride copolymer of the same type used in Examples 1-5 (20 parts by weight), "IM-7565" elastomeric olefin polymer (30 parts by weight), and "Bondfast 2B" ethylene/glycidyl methacrylate/vinyl acetate terpolymer (in the amount shown in Table II) were melt-blended and molded using extrusion and molding conditions similar to those employed in the previous examples. For comparative purposes, no epoxy group-containing olefinic copolymer was added in Example 8.

The physical properties of the resulting thermoplastic resin compositions are shown in Table II. As the amount of epoxy group-containing olefinic copolymer was increased, the notched Izod and instrumented impact properties improved significantly. Even with the observed reduction in brittleness, however, the flexural modulus heat resistance was not adversely affected up to a level of about 5.0 phr epoxy-group containing olefinic copolymer. The thermoplastic resin compositions are thus rendered more impact resistant without sacrificing other desirable properties. These examples also demonstrate the improvements which are realized when a two step blending procedure is used. At 2.5 phr epoxy group-containing olefinic copolymer, for example, the resin prepared using the two step process (Example 5) had unexpectedly better impact and heat resistance properties as compared to a resin containing the same amount of "Bondfast 2B" which had been obtained by single step compounding (Example 10).

TABLE I

| Example # | 1* | 2 | 3 | 4 | 5 | 6* | 7* |
|---|---|---|---|---|---|---|---|
| Epoxy Group-Containing Olefinic Copolymer, phr. | 0.0 | 0.38 | 0.61 | 1.25 | 2.59 | — | — |
| Tensile Strength @ yield, psi (@ 2"/min) | 3100 | 3100 | 3100 | 3000 | 2900 | | |
| Flex. Strength @ yield, psi | 5700 | 5900 | 5900 | 6000 | 5900 | | |
| Flex. Modulus, psi × 1000 | 160 | 155 | 160 | 160 | 155 | | |
| DTUL, °F. (264/66 psi) unannealed ⅛" | 130/208 | 130/208 | 142/212 | 149/208 | 145/205 | 131/210 | 117/175 |
| Notched Izod, ft. lb/in | 2.4 | 2.6 | 3.4 | 3.5 | 3.7 | 0.8 | 13.8 |

TABLE I-continued

| Example # | 1* | 2 | 3 | 4 | 5 | 6* | 7* |
| --- | --- | --- | --- | --- | --- | --- | --- |
| Instrumented Impact, ft. lbs. | 6.1 | 9.0 | 10.8 | 13.5 | 16.8 | 3.0 | 22.0 |

*Comparative Examples

TABLE II

| Example # | 8* | 9 | 10 | 11 | 12 |
| --- | --- | --- | --- | --- | --- |
| Epoxy Group-Containing Olefinic Copolymer, phr. | 0.0 | 1.5 | 2.5 | 5.0 | 10.0 |
| Tensile Strength @ yield, psi (@ 2"/min) | 3200 | 3200 | 3000 | 3100 | 2900 |
| Flex. Strength @ yield, psi | 6200 | 6000 | 6200 | 6200 | 5500 |
| Flex. Modulus, psi × 1000 | 146 | 148 | 155 | 157 | 126 |
| DTUL, °F. (264/66 psi) unannealed ⅛" | 140/206 | 136/200 | 132/202 | 121/180 | 117/176 |
| Notched Izod, ft. lb/in | 1.9 | 3.1 | 3.2 | 4.4 | 8.3 |
| Instrumented Impact, ft. lbs. | 4.8 | 7.7 | 11.7 | 17.2 | 23.4 |

*Comparative Examples

EXAMPLES 13–17

Examples 13–17 demonstrate the suitability of various crystalline propylene polymers, random styrenic copolymers, elastomeric olefin polymers, and epoxy group-containing olefinic copolymers for use in the thermoplastic resin compositions of this invention. The composition of each of the resin components is described below. The resin components are melt-blended in the proportions shown in Table III using the single step procedure described in Examples 8–12 to yield compatibilized thermoplastic resin compositions having good heat resistance and impact

Crystalline Propylene Polymers

A-1: "Escorene 1042" polypropylene, a propylene homopolymer having a melt flow rate of 1.9 g/10 min., sold by Exxon Chemical.

A-2: "Marlex HGH-050" polypropylene, a propylene homopolymer having a melt flow rate of 5.0 g/10 min., sold by Phillips.

A-3: "Tenite P64MZ-007" polypropylene, a propylene copolymer having a melt flow rate of 8.0 g/10 min., sold by Eastman.

A-4: "Fina 3662" polypropylene, a propylene homopolymer having a melt flow rate of 12 g/10 min., sold by Fina Oil.

A-5: "Norchem NPP8404HJ" polypropylene, a propylene copolymer having a melt flow rate of 3 g/10 min., sold by Quantum Chemical Corp.

A-6: "Unipol 5CO4Z", polypropylene, a propylene homopolymer having a melt flow rate of 20 g/10 min., sold by Shell Chemical Company.

A-7" "Pro-Fax 7523" polypropylene, a propylene copolymer having a melt flow rate of 4 g/10 min., sold by Himont.

Random Styrenic Copolymers

B-1: A rubber-modified styrene/maleic anhydride random copolymer containing about 13 weight percent maleic anhydride, prepared in accordance with the procedures of U.S. Pat. No. 3,919,354. The copolymer has a melt flow rate of about 1.0 g/10 min. (Condition L) and contains about 15 weight percent of a grafted styrene/butadiene block copolymer rubber.

B-2: A terpolymer containing 65 weight percent styrene, 24 weight percent maleic anhydride, and 11 weight percent acrylonitrile and grafted with 16 weight percent of a polybutadiene rubber; prepared in accordance with Example 5 of U.S. Pat. No. 4,223,096.

B-3: A styrene/maleic anhydride copolymer containing about 8 weight percent maleic anhydride and having a melt flow rate of about 1.6 g/10 min.

B-4: A styrene/maleic anhydride/methacrylic acid terpolymer containing 74 weight percent styrene, 16 weight percent maleic anhydride, and 10 weight percent methacrylic acid, prepared in accordance with Example 9 of Jpn. Pat. No. 61-255913.

B-5: A styrenic copolymer containing about 56 weight percent styrene, 13 weight percent acrylonitrile, 16 weight percent N-phenylmaleimide, 5 weight percent maleic anhydride and 10 weight percent methacrylic acid, prepared in accordance with Example 10 of Jpn. Pat. No. 61-255913.

B-6: A styrene/maleic anhydride random copolymer containing about 14 weight percent maleic anhydride and having a melt flow rate of about 1.6 g/10 min (Condition L).

B-8: A 50/10/15/5 styrene/p-methyl styrene/maleic anhydride/citraconic anhydride random copolymer containing about 20 weight percent of "Krynac 34.50" (an acrylonitrile/butadiene rubber containing 34% acrylonitrile, sold by Polysar) and prepared in accordance with U.S. Pat. No. 3,919,354.

Elastomeric Olefin Polymers

C-1: An EPDM rubber having an iodine value of 8.5 and a Mooney viscosity of 61 containing ethylidenenorbornene as the diene component and 43 weight percent propylene.

C-2: "Royalene 525", an EPDM rubber produced by Uniroyal having an iodine value of 20 and a Mooney viscosity of 62–75.

C-3: "Keltan 320", an EPDM rubber produced by DSM having a Mooney viscosity of 32 and containing dicyclopentadiene as the diene component.

C-4: "Vistalon 719", a high ethylene EP rubber produced by Exxon Chemical Co. having a Mooney viscosity of 45–55.

C-5: "Royalene 100", an EP rubber produced by Uniroyal having a Mooney viscosity of 45 and ethylene/propylene ratio of 45/55.

C-6: "Kraton G-1652", a linear hydrogenated styrene/butadiene block copolymer produced by Shell Chemical Company and containing 29% styrene.

C-7: "Sol T-166", a styrene/butadiene block copolymer containing about 30% styrene and having a number average molecular weight of about 80,000, sold by Enichem.

Epoxy Group-Containing Olefinic Copolymers

D-1: An ethylene/glycidyl methacrylate/vinyl acetate terpolymer containing 90 weight percent ethylene, 7 weight percent glycidyl methacrylate, and 3 weight percent vinyl acetate, prepared in accordance with the procedures of U.S. Pat. No. 4,444,950.

D-2: An ethylene/glycidyl methacrylate copolymer containing 10 weight percent glycidyl methacrylate, prepared in accordance with the procedures of U.S. Pat. No. 4,444,950.

D-3: An ethylene/propylene/allyl glycidyl ether terpolymer containing 70 weight percent ethylene, 15 weight percent propylene, and 15 weight percent allyl glycidyl ether.

D-4: An ethylene/p-glycidyl styrene/n-butyl acrylate terpolymer containing 60 weight percent ethylene, 10 weight percent p-glycidyl styrene, and 30 weight percent n-butyl acrylate.

D-5: An ethylene/propylene/3,4-epoxy butene/vinyl acetate copolymer containing 70 weight percent ethylene, 10 weight percent propylene, 12 weight percent 3,4-epoxy butene, and 8 weight percent vinyl acetate.

D-6: An ethylene/glycidyl methacrylate/vinyl butyrate terpolymer terpolymer containing 85 weight percent ethylene, 5 weight percent glycidyl methacrylate, and 10 weight percent vinyl butyrate.

D-7: An ethylene/glycidyl acrylate copolymer containing 20 weight percent glycidyl acrylate.

TABLE III

| Example # | 13 | 14 | 15 | 16 | 17 | 18 | 19 |
|---|---|---|---|---|---|---|---|
| Crystalline Propylene Polymer | A-1 | A-2 | A-3 | A-4 | A-5 | A-6 | A-7 |
| pbw | 35 | 70 | 55 | 45 | 60 | 65 | 38 |
| Random Styrenic Copolymer | B-1 | B-2 | B-3 | B-4 | B-5 | B-6 | B-7 |
| pbw | 35 | 10 | 30 | 25 | 20 | 13 | 40 |
| Elastomeric Olefin Polymer | C-1 | C-2 | C-3 | C-4 | C-5 | C-6 | C-7 |
| pbw | 25 | 19 | 5 | 27 | 18 | 15 | 10 |
| Epoxy Group-Containing Olefinic Copolymer | D-1 | D-2 | D-3 | D-4 | D-5 | D-6 | D-7 |
| pbw | 5 | 1 | 10 | 3 | 2 | 7 | 12 |

I claim:

1. A thermoplastic resin composition comprising:
  A. from about 25 to 75 weight percent of a crystalline propylene polymer;
  B. from about 5 to 40 weight percent of a random styrenic copolymer of
    i. from about 50 to 99 weight percent of a vinyl aromatic monomer;
    ii. from about 1 to 30 weight percent of an unsaturated dicarboxylic acid derivative; and
    iii. optionally, up to about 40 weight percent of a copolymerizable ethylenically unsaturated monomer selected from the group consisting of unsaturated nitriles, unsaturated carboxylic acids, unsaturated carboxylic acid esters, and mixtures thereof;
  C. from about 2 to 40 weight percent of an elastomeric olefin polymer selected from the group consisting of ethylene-propylene copolymers, ethylene-propylene-diene terpolymers, blends of ethylene-propylene copolymers with ethylene homopolymers, blends of ethylene-propylene-diene terpolymers with ethylene homopolymers mono-vinyl aromatic monomer/conjugated diene block copolymers, and hydrogenated mono-vinyl aromatic monomer/conjugated diene block copolymers; and
  D. from about 0.05 to 15 weight percent of an epoxy group-containing olefinic copolymer of
    i. from about 0.1 to 25 weight percent of an unsaturated epoxy monomer;
    ii. from about 50 to 99 weight percent of an $\alpha$-olefin; and
    iii. optionally, up to about 50 weight percent of an ethylenically unsaturated ester.

2. The thermoplastic resin composition of claim 1 wherein the crystalline propylene polymer is selected from the group consisting of crystalline propylene homopolymers, crystalline propylene-ethylene copolymers, and mixtures thereof.

3. The thermoplastic resin composition of claim 1 wherein the vinyl aromatic monomer in the random styrenic copolymer is styrene.

4. The thermoplastic resin composition of claim 1 wherein the unsaturated dicarboxylic acid derivative in the random styrenic copolymer is an unsaturated dicarboxylic acid anhydride.

5. The thermoplastic resin composition of claim 1 wherein the random styrenic copolymer is a random copolymer of styrene and maleic anhydride.

6. The thermoplastic resin composition of claim 1 wherein the elastomeric olefin polymer is a blend of an ethylene-propylene-diene terpolymer and an ethylene homopolymer.

7. The thermoplastic resin composition of claim 1 wherein the unsaturated epoxy monomer is selected from the group consisting of unsaturated glycidyl esters, glycidyl vinyl aromatic monomers, unsaturated glycidyl ethers and epoxy alkenes.

8. The thermoplastic resin composition of claim 1 wherein the $\alpha$-olefin is ethylene.

9. The thermoplastic resin composition of claim 1 wherein the epoxy group-containing olefinic copolymer is selected from the group consisting of copolymers of ethylene and glycidyl methacrylate and terpolymers of ethylene, glycidyl methacrylate, and vinyl acetate.

10. A thermoplastic resin composition comprising:
  A. from about 40 to 60 weight percent of a crystalline propylene polymer selected from the group consisting of crystalline propylene homopolymers and crystalline propylene-ethylene copolymers;
  B. from about 15 to 30 weight percent of a random copolymer of from about 70 to 95 weight percent styrene and from about 5 to 30 weight percent maleic anhydride;
  C. from about 15 to 35 weight percent of an elastomeric olefin polymer selected from the group consisting of ethylene-propylene copolymers, ethylene-propylene-diene terpolymers, blends of ethylene-propylene copolymers with ethylene homopolymers, and blends of ethylene-propylene-diene terpolymers with ethylene homopolymers; and D. from about 0.25 to 5 weight percent of an epoxy group-containing olefinic copolymer selected from the group consisting of copolymers of ethylene and glycidyl methacrylate and terpolymers of ethylene, glycidyl methacrylate, and vinyl acetate.

11. The thermoplastic resin composition of claim 10 wherein the random copolymer of styrene and maleic anhydride is rubber-modified with from about 1 to 25 weight percent of a grafted conjugated diene elastomer.

12. The thermoplastic resin composition of claim 11 wherein the grafted conjugated diene elastomer is selected from the group consisting of styrene-butadiene block copolymers, styrene-butadiene random copolymers, butadiene homopolymers, and mixtures thereof.

13. The thermoplastic resin composition of claim 10 wherein the elastomeric olefin polymer is a blend of an ethylene-propylene-diene terpolymer with a high density polyethylene.

14. The thermoplastic resin composition of claim 10 wherein the epoxy group-containing olefinic copolymer is a copolymer of from about 80 to 99 weight percent ethylene and from about 1 to 20 weight percent glycidyl methacrylate.

15. The thermoplastic resin composition of claim 10 wherein the epoxy group-containing olefinic copolymer is a terpolymer of from about 60 to 99 weight percent ethylene, from about 1 to 20 weight percent glycidyl methacrylate, and from about 1 to 20 weight percent vinyl acetate.

16. A process for producing a compatibilized thermoplastic resin composition having improved heat distortion and impact properties comprising the steps of:
I. melt blending
  A. a random styrenic copolymer of
    i. from about 50 to 99 weight percent of a vinyl aromatic monomer;
    ii. from about 1 to 30 weight percent of an unsaturated dicarboxylic acid anhydride; and
    iii. optionally, up to about 40 weight percent of a copolymerizable ethylenically unsaturated monomer selected from the group consisting of unsaturated nitriles, unsaturated carboxylic acids, and unsaturated carboxylic acid esters;
  B. a first portion of an elastomeric olefin polymer selected from the group consisting of ethylene-propylene copolymers, ethylene-propylene-diene terpolymers, blends of ethylene-propylene copolymers with ethylene homopolymers, blends of ethylene-propylene-diene terpolymers with ethylene homopolymers mono-vinyl aromatic monomer/conjugated diene block copolymers, and hydrogenated mono-vinyl aromatic monomer/conjugated diene block copolymers; and
  C. an epoxy group-containing olefinic copolymer of
    i. from about 0.1 to 25 weight percent of an unsaturated epoxy monomer;
    ii. from about 50 to 99 weight percent of an α-olefin; and
    iii. optionally, up to about 50 weight percent of an ethylenically unsaturated ester;
to obtain a first polyblend; and
II. melt-blending the first polyblend with
  A. a crystalline propylene polymer; and
  B. a second portion of the elastomeric olefin polymer; to form the compatibilized thermoplastic resin composition, wherein the crystalline propylene polymer is from about 25 to 75 weight percent of the resin composition, the random styrenic copolymer is from about 5 to 40 weight percent of the resin composition, the elastomeric olefin polymer is from about 2 to 40 weight percent of the resin composition, the epoxy group-containing olefinic copolymer is from about 0.05 to 15 weight percent of the resin composition, and the first portion of the elastomeric olefin polymer is at least about 1 percent of the total amount of the elastomeric olefin polymer.

17. The process of claim 16 wherein melt-blending steps I and II are performed at a temperature of from about 190° C. to 330° C.

18. The process of claim 16 wherein the random styrenic copolymer is a random copolymer of styrene and maleic anhydride.

19. The process of claim 16 wherein the unsaturated epoxy monomer is selected from the group consisting of unsaturated glycidyl esters, unsaturated glycidyl ethers, glycidyl vinyl aromatic monomers, and epoxy alkenes.

20. A process for producing a compatibilized thermoplastic resin composition having improved heat distortion and impact properties comprising the steps of:
I. melt-blending at a temperature of from about 190° C. to 330° C.
  A. a random copolymer of from about 70 to 95 weight percent styrene and from about 5 to 30 weight percent maleic anhydride;
  B. a first portion of an elastomeric olefin polymer selected from the group consisting of ethylene-propylene copolymers, ethylene-propylene-diene terpolymers, blends of ethylene-propylene copolymers with ethylene homopolymers, and blends of ethylene-propylene-diene terpolymers with ethylene homopolymers; and
  C. an epoxy group-containing olefinic copolymer selected from the group consisting of copolymers of ethylene and glycidyl methacrylate and terpolymers of ethylene, glycidyl methacrylate, and vinyl acetate; to form a first polyblend; and
II. melt-blending at a temperature of from about 190° C. to 330° C.
  A. the first polyblend; and
  B. a crystalline propylene polymer selected from the group consisting of crystalline propylene homopolymers, and crystalline propylene-ethylene copolymers; to form the compatibilized thermoplastic resin composition, wherein the crystalline propylene polymer is from about 40 to 60 weight percent of the resin composition, the random styrenic copolymer is from about 15 to 30 weight percent of the resin composition, the elastomeric olefin polymer is from about 15 to 35 weight percent of the resin composition, the epoxy group-containing olefinic copolymer is from about 0.25 to 5 weight percent of the resin composition, and the first portion of the elastomeric olefin polymer is at least about 5 percent of the total amount of the elastomeric olefin polymer.

* * * * *